(12) United States Patent
Nagao et al.

(10) Patent No.: US 8,186,476 B2
(45) Date of Patent: May 29, 2012

(54) STRADDLE TYPE VEHICLE

(75) Inventors: Tokinari Nagao, Shizuoka (JP); Atsushi Sawabuchi, Shizuoka (JP); Takashi Ashida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 210 days.

(21) Appl. No.: 12/644,139

(22) Filed: Dec. 22, 2009

(65) Prior Publication Data
US 2010/0163332 A1    Jul. 1, 2010

(30) Foreign Application Priority Data

Dec. 26, 2008 (JP) ................................. 2008-332112

(51) Int. Cl.
*B60K 13/00* (2006.01)

(52) U.S. Cl. ....................................................... 180/335

(58) Field of Classification Search .................. 180/335, 180/366, 333, 334, 336; 701/103
See application file for complete search history.

(56) References Cited

U.S. PATENT DOCUMENTS

| | | | | |
|---|---|---|---|---|
| 4,058,105 A * | 11/1977 | Schellin et al. | ........ | 123/198 DC |
| 4,138,601 A * | 2/1979 | Nakamura et al. | ........ | 200/61.85 |
| 4,155,418 A | 5/1979 | Tremblay et al. | | |
| 4,186,291 A * | 1/1980 | Swanson | .................... | 200/61.86 |
| 4,213,513 A * | 7/1980 | Beck | .............................. | 180/272 |
| 4,838,113 A * | 6/1989 | Matsushima et al. | ........ | 74/551.8 |
| 5,829,312 A * | 11/1998 | Berg et al. | ..................... | 74/502.2 |
| 6,159,059 A * | 12/2000 | Bernier et al. | .................. | 440/40 |
| 6,231,410 B1 * | 5/2001 | Bernier et al. | .................. | 440/40 |
| 6,551,153 B1 * | 4/2003 | Hattori | ............................. | 440/87 |
| 6,699,085 B2 * | 3/2004 | Hattori | ............................. | 440/87 |
| 7,195,527 B2 * | 3/2007 | Tani et al. | ........................ | 440/87 |
| 2010/0168985 A1 * | 7/2010 | Nagao et al. | .................. | 701/103 |

FOREIGN PATENT DOCUMENTS

JP    53-013726 A    2/1978

OTHER PUBLICATIONS

Nagao et al.; "Straddle Type Vehicle"; U.S. Appl. No. 12/644,143; filed Dec. 22, 2009.

* cited by examiner

*Primary Examiner* — Faye M. Fleming
(74) *Attorney, Agent, or Firm* — Keating & Bennett, LLP

(57) ABSTRACT

A snowmobile includes an engine, a handle, an operation portion, an operation input detector, an operation amount detector, and a control portion. The handle includes a grip grasped by the rider. The operation portion is provided near the grip to control driving of the engine. The operation input detector is provided near the grip to detect whether operation of the operation portion has been carried out by the rider. The operation amount detector electrically detects the operation amount of the operation portion. The control portion controls driving of the engine based on the operation amount detected by the operation amount detector when operation of the operation portion by the rider is detected at the operation input detector.

20 Claims, 14 Drawing Sheets

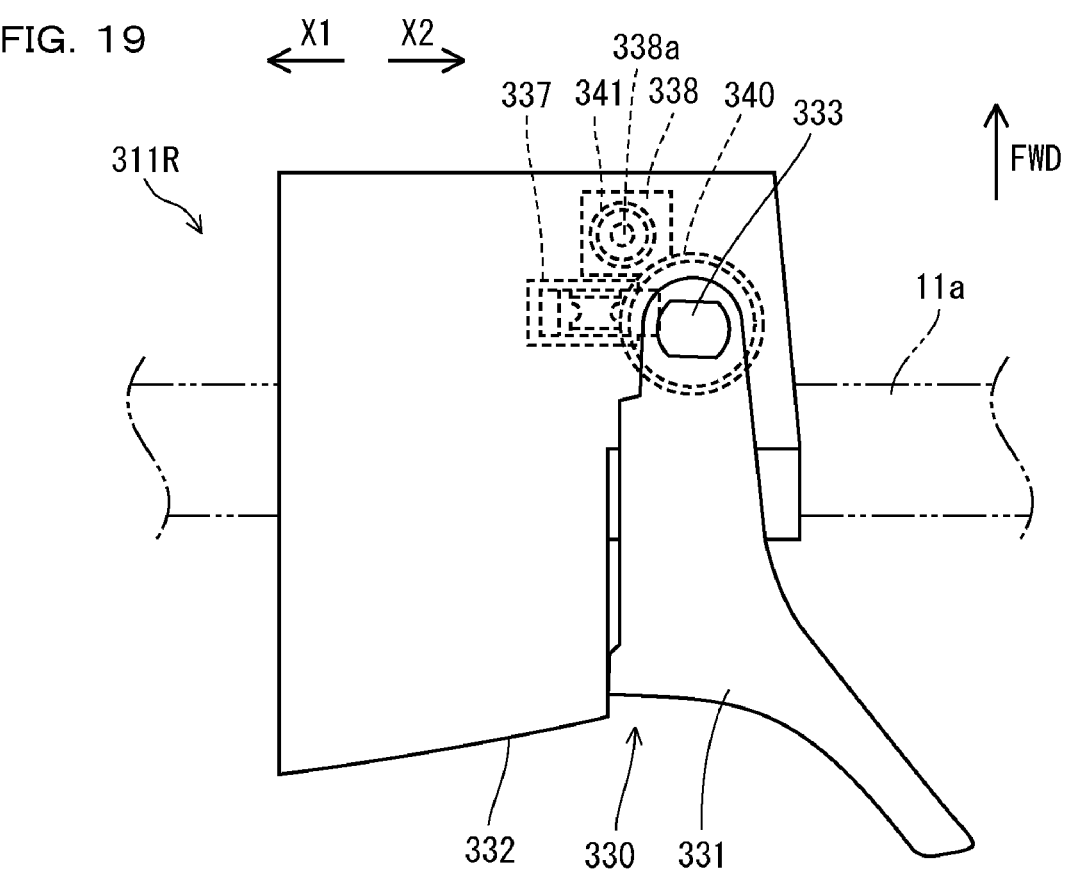

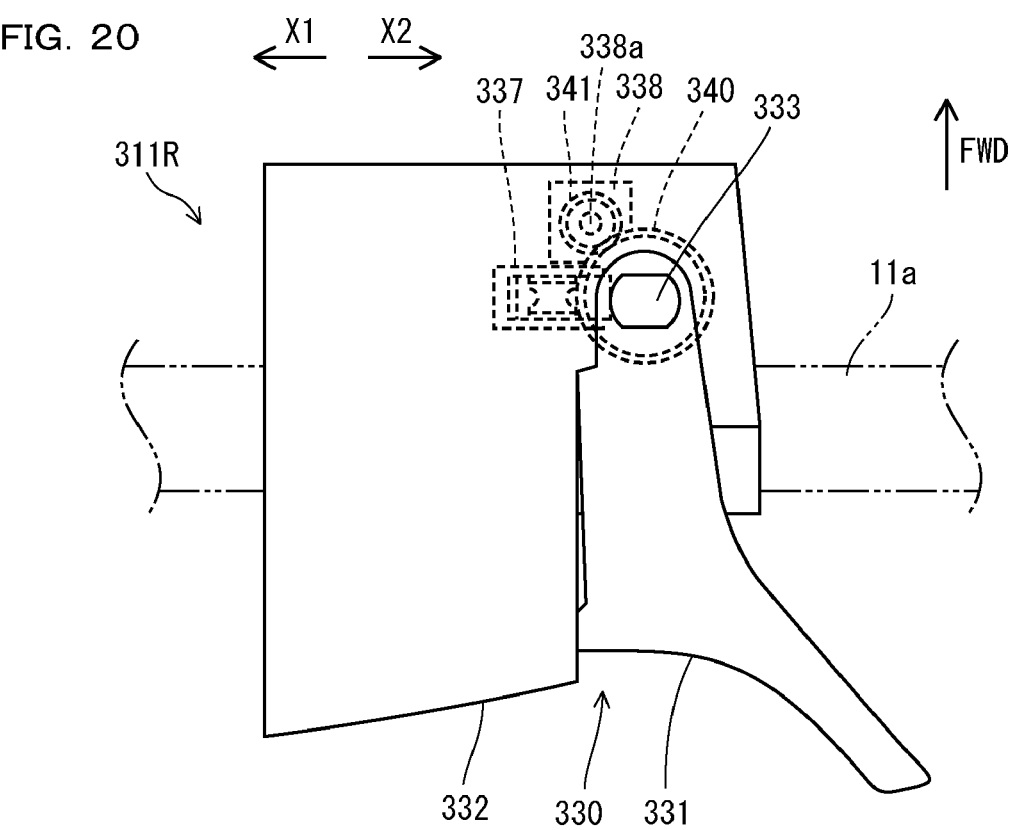

STRADDLE TYPE VEHICLE

BACKGROUND OF THE INVENTION

1. Field of the Invention

The present invention relates to straddle type vehicles and more specifically to a straddle type vehicle including an operation portion used to control driving of an engine.

2. Description of the Related Art

There are known straddle type vehicles including an engine and an operation portion that is operated by a rider to control driving of the engine. JP S53-13726 A discloses a snowmobile as such a straddle type vehicle. According to the disclosure of JP S53-13726 A, the snowmobile includes an engine and a throttle lever that is operated by a rider to control driving of the engine. The snowmobile is provided with a carburetor used to supply fuel into an intake path for the engine. The carburetor is provided with a throttle valve that can open/close the intake path. The throttle valve is connected to the throttle lever by a Bowden cable (wire). The Bowden cable is moved in response to the movement of the throttle lever when the throttle lever is operated by a rider. The throttle valve is opened/closed according to the movement of the Bowden cable, so that the amount of air-fuel mixture to be taken into the engine is regulated.

In this way, the snowmobile disclosed by JP 53-13726 A has the Bowden cable used to mechanically connect the throttle lever and the throttle valve used to regulate the amount of air-fuel mixture to be taken into the engine. Such an extensive mechanism is required to allow the rider to control driving of the engine.

SUMMARY OF THE INVENTION

Snow seasons have become shorter because of recent global warming. Therefore, snowmobile users have fewer opportunities to enjoy riding the vehicles for the shortened snow seasons. The inventor has noticed that more users tend to plan long-distance touring in quest of snow so that they can enjoy riding their snowmobiles as long as possible in the thus shortened snow seasons.

In such long-distance touring, a vehicle often travels for long hours while fully opening its throttle valve. When the vehicle travels for long hours while fully opening the throttle valve, the throttle valve may be fixed by freezing. If the throttle valve is still open though the rider stops operating the throttle lever, deceleration control must be carried out.

In the field of snowmobiles, stable low speed travelling has been enabled as more four-cycle engines that provide a flat, high torque characteristic in a low engine speed range have been introduced. With a two-cycle engine, the torque is low in a low engine speed range and the torque abruptly increases as the rotation speed increases. The throttle lever is intermittently operated in order to increase and decrease the engine speed while traveling at low speed, so that torque in a prescribed level is maintained. In contrast, with a four-cycle engine, stable torque can be obtained during low speed travelling. The inventor has realized that more riders drive at low speed while keeping the throttle in a half-open state.

When a rider who operates a vehicle with a four-cycle engine travels for long hours while keeping the throttle lever operated in a half-open state, the hand operating the throttle lever becomes extremely tired. The throttle lever and the throttle valve are connected by a Bowden cable. When the rider loosens his hold of the throttle lever, the throttle valve must be rotated in the direction in which the intake path is closed by the force of a spring attached to the throttle valve. In order to prevent the throttle valve from being fixed by freezing, the elastic force of the spring must be increased. However, as the elastic force of the spring increases, the rider needs more strength to operate the throttle lever. In this arrangement, it is very burdensome for the rider to operate the throttle valve in a half-open state for long hours.

In consideration of the above-described circumstances of late, the inventor has noticed that the problem associated with the arrangement in which the Bowden cable connects the throttle lever and the throttle valve would become worse in the future. Whether the rider carries out operation on the throttle lever must be detected correctly and the operation on the throttle lever must correspond exactly to the operation of the throttle valve.

In view of the above, a straddle type vehicle according to a preferred embodiment of the present invention includes an engine, a handle, an operation portion, an operation input detector, an operation amount detector, and a control portion. The handle includes a grip grasped by a rider. The operation portion is provided near the grip to control driving of the engine. The operation input detector is provided near the grip to detect whether operation of the operation portion by the rider is carried out. The operation amount detector is provided near the grip to electrically detect the operation amount of the operation portion. The control portion controls driving of the engine based on the operation amount detected by the operation amount detector when operation of the operation portion by the rider is detected at the operation input detector.

It is not necessary to connect the components used to control the engine and the operation portion operated by the rider to control driving of the engine by wires. The mechanism used to control driving of the engine can be prevented from becoming elaborate and large-sized.

The operation portion, the operation input detector, and the operation amount detector are preferably arranged close to one another. Therefore, wires or the like necessary for electrically connecting the operation portion, the operation input detector, and the operation amount detector can be shortened.

The operation input detector detects whether the operation is carried out by the rider, and therefore the engine can be controlled depending on whether the operation is carried out.

Thus, preferred embodiments of the present invention prevent the mechanism used to control driving of the engine from becoming elaborate and large-sized. In addition, preferred embodiments of the present invention carry out appropriate engine control in response to the rider's operation.

Other elements, features, steps, characteristics and advantages of the present invention will become more apparent from the following detailed description of the preferred embodiments with reference to the attached drawings.

BRIEF DESCRIPTION OF THE DRAWINGS

FIG. 19 is an enlarged plan view of a handle according to the fifth preferred embodiment of the present invention.

FIG. 20 is an enlarged plan view of the handle according to the fifth preferred embodiment of the present invention.

DETAILED DESCRIPTION OF THE PREFERRED EMBODIMENTS

First Preferred Embodiment

Figure 1:
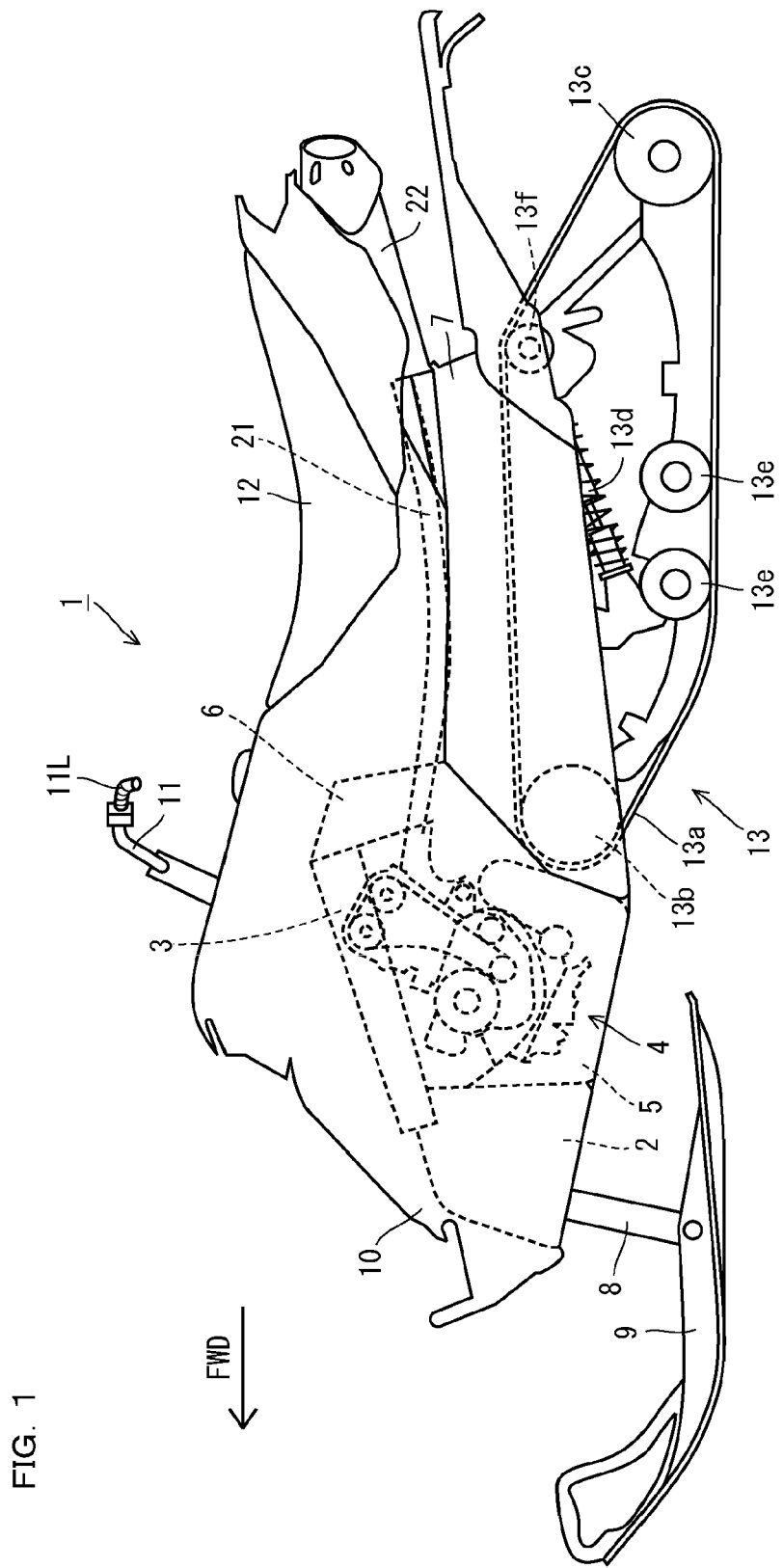
FIG. 1 is a side view showing an entire structure of a snowmobile according to a first preferred embodiment of the present invention.

A first preferred embodiment of the present invention will be described. According to the first preferred embodiment, a snowmobile 1 will be described as a straddle type vehicle according to the present invention. In the drawings, the arrow FWD refers to the forward advancing direction of the snowmobile 1. In the following description, the "front-back" direction and the "right" and "left" refer to these directions viewed from a rider on the snowmobile 1 unless otherwise specified.

FIG. 1 is a left side view of an entire structure of the snowmobile 1 according to the first preferred embodiment of the present invention. As shown in FIG. 1, a front frame 2 is provided in the front portion of the vehicle. A main frame 3 is connected to the upper portion of the front frame 2. The main frame 3 extends backward and upward. An under frame 5 is connected to the rear portion of the front frame 2. The rear portions of the main frame 3 and the under frame 5 are coupled by a coupling frame 6. A rear frame 7 is connected to the rear portions of the under frame 5 and the coupling frame 6. The rear frame 7 extends backward. The front frame 2, the main frame 3, the under frame 5, the coupling frame 6, and the rear frame 7 define the body frame.

A pair of right and left ski holding frames 8 is provided under the front frame 2. A pair of right and left skis 9 is provided at the lower end of the pair of ski holding frames 8. The skis 9 turn to the right and the left as the ski holding frames 8 turn to the right and the left. A front cowling 10 arranged to cover the front part of the vehicle body is provided in front of and above the front frame 2.

A handle 11 connected to the ski holding frames 8 is provided above the main frame 3. As the handle 11 is turned, the skis 9 are turned to the right or left, so that the advancing direction of the snowmobile 1 can be determined.

A seat 12 is provided above the rear frame 7. A driving track 13 is provided under the rear frame 7. The driving track 13 includes a rubber track belt 13a, front and rear axles 13b and 13c provided inside the track belt 13a, and a suspension 13d used to absorb impact. The front axle 13b rotates the track belt 13a by driving power of the engine 4. This allows the snowmobile 1 to travel. A plurality of guide wheels 13e and 13f used to prevent the loosening of the track belt 13a are provided inside the track belt 13a.

The engine 4 is provided in front of the front axle 13b. The engine 4 is supported by the body frame.

Figure 2:
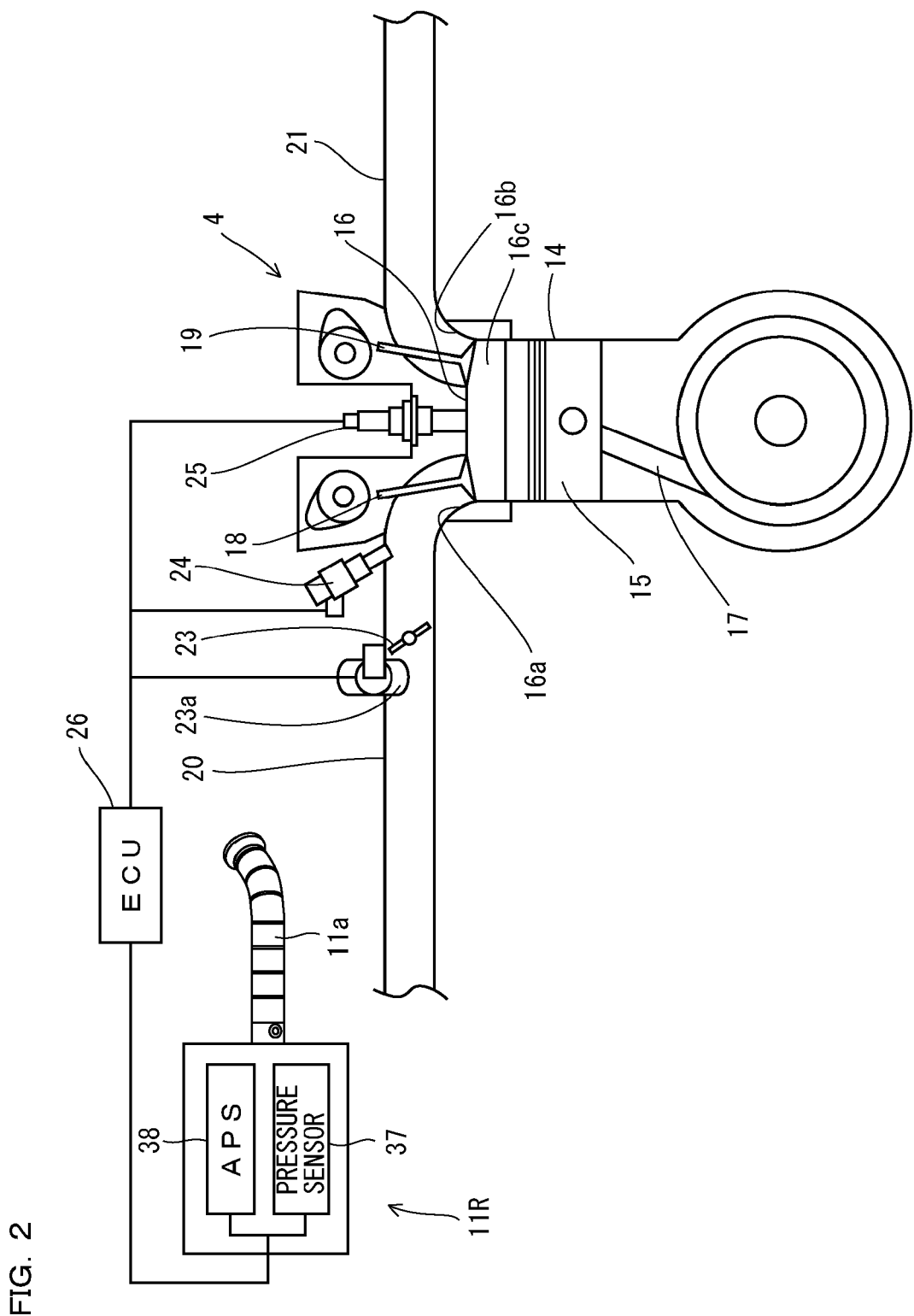
FIG. 2 is a system diagram of a peripheral structure of an ECU in the snowmobile according to the first preferred embodiment of the present invention.

FIG. 2 is a system diagram of the engine 4 and a peripheral structure of an ECU (Engine Control Unit) 26. As shown in FIG. 2, the engine 4 includes a cylinder 14, a piston 15 arranged to move in the vertical direction in the cylinder 14 and a cylinder head 16 provided above the cylinder 14. One end of a connecting rod 17 is rotatably attached to the piston 15. The cylinder head 16 is provided to close one opening of the cylinder 14. The cylinder head 16 has an intake port 16a and an exhaust port 16b. The intake and exhaust ports 16a and 16b are provided with an intake valve 18 and an exhaust valve 19, respectively. A combustion chamber 16c is provided in the lower portion of the cylinder head 16.

The intake port 16a is arranged to supply an air-fuel mixture containing air and fuel to the combustion chamber 16c. The intake port 16a is connected with an intake pipe 20. The exhaust port 16b is arranged to discharge residual gas after combustion from the combustion chamber 16c. An exhaust pipe 21 is connected to the exhaust port 16b. A muffler 22 is connected to the rear end of the exhaust port pipe 21 as shown in FIG. 1.

As shown in FIG. 2, a throttle valve 23 is attached to the intake pipe 20 so that it can be opened/closed. The throttle valve 23 is an example of the "intake control valve" according to a preferred embodiment of the present invention. The throttle valve 23 is provided to control driving of the engine 4. The throttle valve 23 rotates to control the open state and the closed state of the intake valve 20 and regulates the amount of air to be taken into the intake port 16a of the engine 4 from the intake pipe 20.

A TPS (Throttle Position Sensor) 23a that detects the rotation position of the throttle valve 23 is provided near the throttle valve 23 of the intake pipe 20. The TPS 23a is an example of the "control state detector" and the "opening/closing detector" according to a preferred embodiment of the present invention. An injector 24 that injects fuel toward the engine 4 is attached between the throttle valve 23 in the intake pipe 20 and the intake port 16a. An ignition plug 25 used to ignite air-fuel mixture from the intake port 16a is attached to the combustion chamber 16c.

An ECU (Engine Control Unit) 26 that receives a detection signal transmitted from the TPS 23a is connected to the TPS 23a. The ECU 26 is an example of the "control portion" according to a preferred embodiment of the present invention. The ECU 26 controls the opening/closing of the throttle valve 23, the injection amount of fuel by the injector 24 and the ignition by the ignition plug 25 based on a detection signal for the rotation amount of the thumb throttle 31 (that will be described) operated by the rider. In this way, the ECU 26 controls driving of the engine 4.

Figure 3:
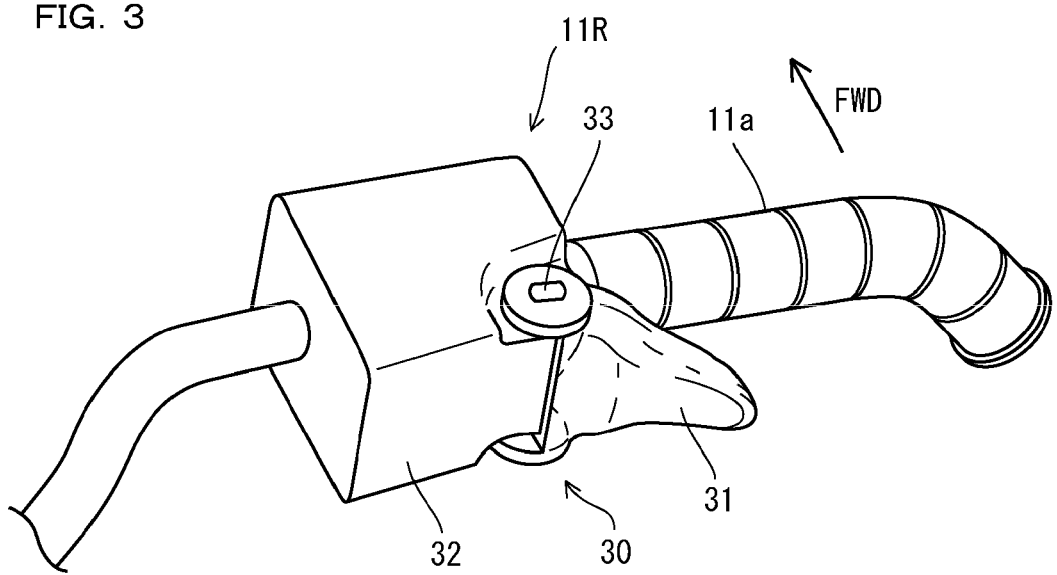
FIG. 3 is a perspective view of a handle according to the first preferred embodiment of the present invention.

FIG. 3 is a perspective view of a right handle 11R. As shown in FIG. 3, the right handle 11R includes a grip 11a grasped by the rider and an operation portion 30 provided near the grip 11a. The operation portion 30 is operated by the right hand of the rider to control driving of the engine 4. More specifically, the operation portion 30 controls driving of the engine 4 by controlling the open/closed state of the throttle valve 23. The operation portion 30 includes a resin thumb throttle 31 operated by the rider's right hand and a case 32 that supports the thumb throttle 31. The thumb throttle 31 is rotatably supported at the case 32. The thumb throttle 31 is an example of the "throttle lever" according to a preferred embodiment of the present invention.

In the specification, the throttle lever refers to an operation tool provided separately from the grip 11a in the vicinity of the grip 11a and used to control driving of the engine 4. More specifically, in the described arrangement, driving of the engine is not controlled by operating the grip 11a itself but a separate operation tool is provided near the grip 11a. The operation tool is not limited to such a rotational lever or any particular kind.

The handle 11 includes a left handle 11L (see FIG. 1) symmetrically positioned relative to the right handle 11R. However, the left handle 11L does not include the operation portion 30.

Figure 4:
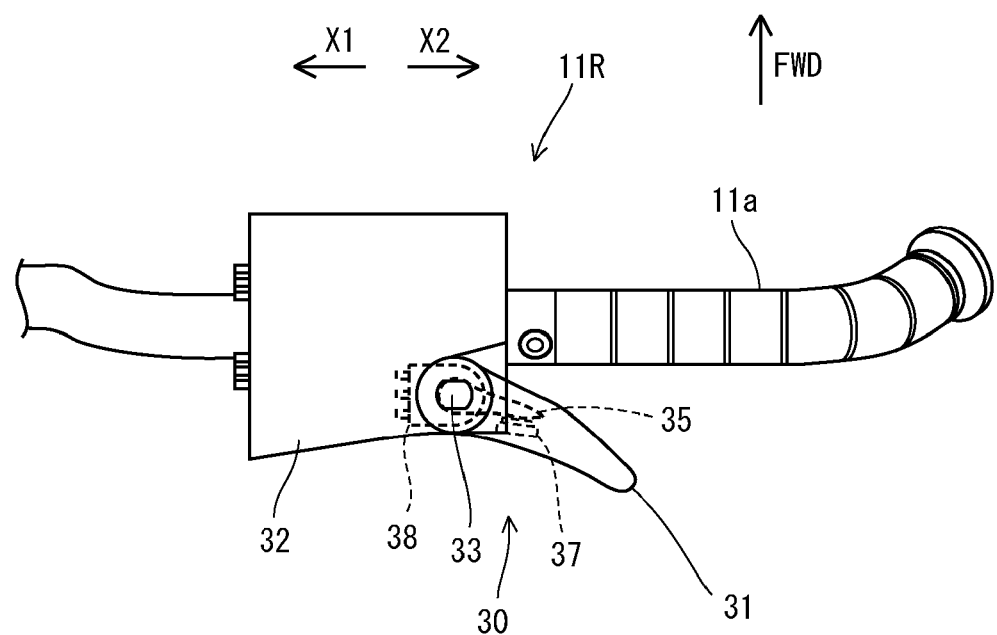
FIG. 4 is a plan view of the handle according to the first preferred embodiment of the present invention.

FIG. 4 is a plan view of the right handle 11R. As shown in FIG. 4, the grip 11a extends to the right of the vehicle (in the X2-direction). The thumb throttle 31 extends rightward and backward (opposite to the direction of the arrow FWD).

Figure 5:
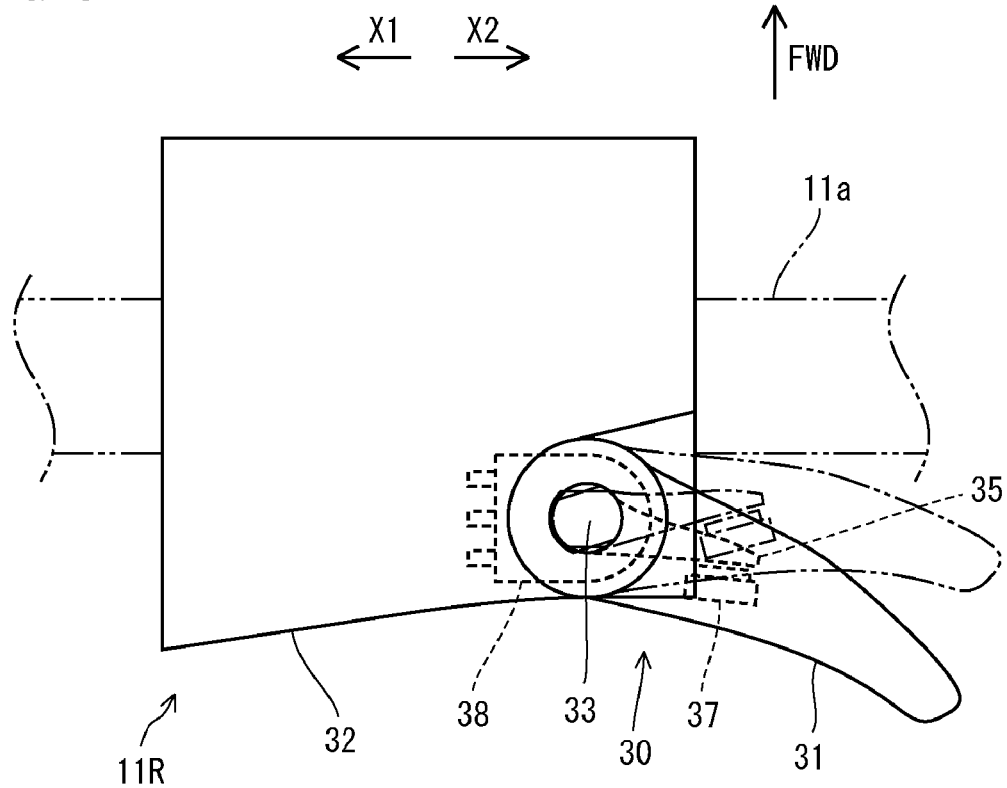
FIG. 5 is an enlarged plan view of the handle according to the first preferred embodiment of the present invention.

FIG. 5 is an enlarged plan view of the right handle 11R. As shown in FIG. 5, the thumb throttle 31 can rotate in the horizontal direction around the rotation shaft 33. The rotation shaft 33 is preferably made of metal and rotatably attached to the resin case 32. The rotation shaft 33 is provided behind the grip 11a. The rotation shaft 33 is provided in a position nearer to the rider on the snowmobile 1 than the grip 11a.

The rider controls the thumb throttle 31 by the thumb of the right hand while grasping the grip 11a by the right hand. When the rider pushes the thumb throttle 31 forward by the thumb of the right hand, the thumb throttle 31 is rotated forward.

Figure 6:
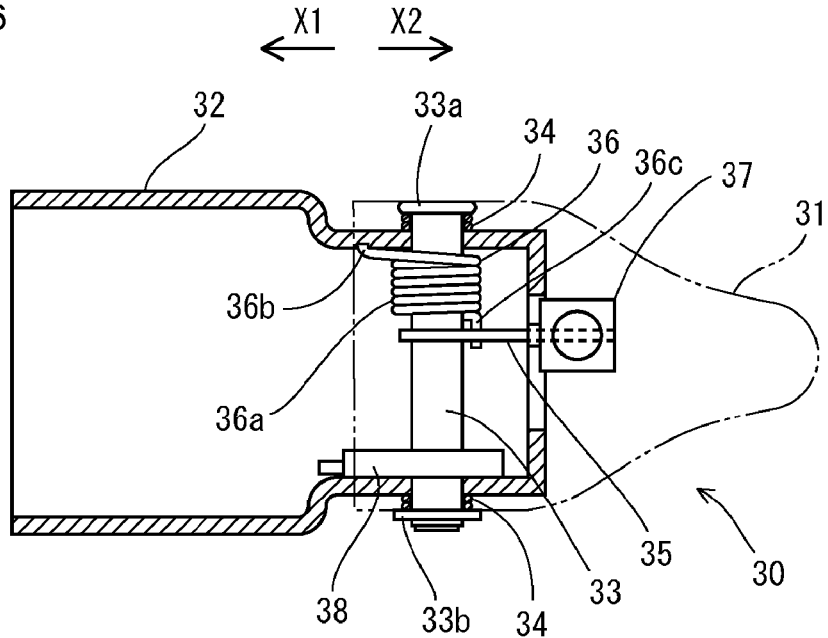
FIG. 6 is a rear sectional view of an internal structure of an operation portion according to the first preferred embodiment of the present invention.

FIG. 6 is a rear sectional view of the internal structure of the operation portion 30. As shown in FIG. 6, a flange 33a is provided at the upper end of the rotation shaft 33. Two rubber O-rings 34 arranged to apply resistance to the rotation operation of the thumb throttle 31 are provided between the flange 33a and the upper surface of the case 32. The O-ring is an example of the "resisting member" according to a preferred embodiment of the present invention. A flange 33b is provided at the lower end of the rotation shaft 33. Further, two O-rings 34 arranged to apply resistance to the rotation operation of the thumb throttle 31 are provided between the flange 33b and the lower surface of the case 32.

An end of a metal arm 35 is attached (e.g., welded) to the rotation shaft 33. The arm 35 extends outward (in the X2-direction) in the widthwise direction of the vehicle from the connection portion with the rotation shaft 33. The other end of the arm 35 is fixed to the thumb throttle 31. The arm 35 is therefore integrally rotated with the rotation operation of the thumb throttle 31. The arm 35 transmits the rotation operation of the thumb throttle 31 to the rotation shaft 33.

A torsion coil spring 36 includes a coil portion 36a arranged around the rotation shaft 33. The torsion coil spring 36 has one end 36b hooked at the inner wall surface of the case 32. The other end 36c of the torsion coil spring 36 is in contact with the arm 35 from the front. In this way, the torsion coil spring 36 pressurizes the thumb throttle 31 backward through the arm 35. The pressurizing force of the torsion coil spring 36 causes the thumb throttle 31 to be rotated to the initial position on the backside when the operation force of the rider is not applied. The torsion coil spring 36 is an example of the "pressurizing member" according to a preferred embodiment of the present invention.

A pressure sensor 37 is provided in the thumb throttle 31 near the end of the arm 35 on the outer side of the widthwise direction of the vehicle (in the X2-direction). The pressure sensor 37 is an example of the "operation input detector" and the "contact sensor" according to a preferred embodiment of the present invention. The pressure sensor 37 determines whether the rider operates the thumb throttle 31 and whether the rider's finger (hand) is in contact with the thumb throttle 31. As shown in FIG. 5, when the rider rotates thumb throttle 31, the thumb throttle 31 is pushed forward (in the direction of the arrow FWD), and therefore the pressure is transmitted to the arm 35 from the thumb throttle 31. The pressure sensor 37 detects the presence/absence of the pressure and thus determines whether the thumb throttle 31 is operated by the rider. The pressure sensor 37 transmits the detection signal to the ECU 26 as shown in FIG. 2.

As shown in FIG. 6, an APS (Accelerator Position Sensor) 38 is arranged coaxially under the rotation shaft 33 in the case 32. The APS 38 is an example of the "operation amount detector" according to a preferred embodiment of the present invention. The APS 38 electrically detects the rotation amount of the thumb throttle 31. The rotation shaft 33 is inserted in the APS 38 and the APS 38 detects the rotation angle of the rotation shaft 33 from the initial position. Using the APS 38, the amount of operation of the thumb throttle 31 by the rider can be detected.

As shown in FIG. 2, the APS 38 transmits a detection signal for the operation amount of the thumb throttle 31 to the ECU 26. The ECU 26 calculates the opening degree of the throttle valve 23, a fuel injection amount and injection timing by the injector 24 and ignition timing by the ignition plug 25 based on the detection signals from the APS 38 and the TPS 23a. The ECU controls driving of the engine 4 based on the results of calculation.

Upon determining that the engine 4 keeps driving while there is no operation input to the thumb throttle 31 by the rider, the ECU 26 carries out control to reduce the engine speed of the engine 4 to a prescribed value or less. More specifically, if no operation pressure to the thumb throttle 31 is detected by the pressure sensor 37 and the TPS 23a determines that the throttle valve 23 is in an open state, the ECU 26 determines that the throttle valve 23 is not operating normally. It is for example determined that peripheral elements or components including the throttle valve 23 are frozen, and that the throttle valve 23 cannot be rotated and returned to the closed state. In response to that determination, the ECU 26 carries out control to gradually close the throttle valve 23 so that the opening degree of the throttle valve 23 reaches an idling opening degree.

According to the first preferred embodiment, the snowmobile 1 includes the operation portion 30 operated by the rider during controlling driving of the engine 4, the APS 38 arranged to electrically detect the operation amount of the operation portion 30 by the rider, and the ECU 26 that controls driving of the engine 4 in response to a detection signal from the APS 38. The operation amount of the operation portion 30 detected by the APS 38 can be transmitted electrically to the ECU 26 that controls driving of the engine 4.

The throttle valve 23 used to control driving of the engine 4 and the operation portion 30 operated by the rider do not have to be connected by a mechanical part such as a wire, and therefore the mechanism used to control driving of the engine 4 can be kept from becoming elaborate and large-sized. The throttle valve is electrically closed by a motor force unlike the arrangement in which the throttle valve is mechanically closed by a spring force, and therefore the operation of opening/closing the throttle valve can surely be carried out. Since there is no mechanism such as a spring used to pressurize the throttle valve in the closing direction, the force necessary for operating the throttle lever can be reduced. In this way, the rider is not tired when the vehicle travels while the throttle lever is kept half-open.

When the throttle valve and the throttle lever are connected by a wire, friction resistance is generated when the wire is moved. The throttle valve is provided with force that returns the throttle valve to the opening side by boost (negative pressure in the intake pipe). For these reasons, the load that pressurizes the throttle valve to the closing side must be raised in the arrangement with the wire. According to the present preferred embodiment, these factors are removed, and therefore the force necessary for operating the throttle lever can be reduced. In addition, the operation burden is not increased if a sufficient load is secured for a return spring used to return the throttle lever to the initial position.

The operation portion 30 is provided near the grip 11a and the pressure sensor 37 and the APS 38 are also provided close to the grip 11a. The operation portion 30, the pressure sensor 37, and the APS 38 are arranged close to one another. Wires necessary for electrically connecting the operation portion 30 and the pressure sensor 37 and the operation portion 30 and the APS 38 can be shortened. The arrangement for electrically connecting the operation portion 30, the pressure sensor 37, and the APS 38 can be simplified.

The snowmobile 1 includes the TPS 23a that detects the opening degree of the throttle valve 23, the pressure sensor 37 that detects the presence/absence of an operation input to the operation portion 30 by the rider, and the ECU 26 that controls driving of the engine 4 based on the detection signals from the TPS 23a and APS 38.

If driving of the engine 4 is detected by the TPS 23a though no operation of the operation portion 30 is detected by the pressure sensor 37, it can be determined that the throttle valve 23 is frozen. In this case, the ECU 26 can carry out control to reduce the engine speed of the engine 4 to a prescribed value or less. The engine 4 can be brought into an idling state automatically by the control by the ECU 26.

According to the first preferred embodiment, the APS 38 is provided coaxially with the rotation shaft 33 of the thumb throttle 31. The rotation amount of the rotation shaft 33 can be detected easily. The mechanism used to detect the operation amount can be compact.

According to the first preferred embodiment, the rotation shaft 33 of the thumb throttle 31 is preferably provided behind the grip 11a. The rotation shaft 33 can be placed closer to the thumb of the right hand of the rider who operates the thumb throttle 31. The radius of gyration of the thumb throttle can be small. The stroke of the thumb throttle 31 can be reduced, and therefore the operation load for the thumb throttle 31 can be alleviated.

According to the first preferred embodiment, the pressure sensor 37 is provided in the thumb throttle 31. The pressure sensor 37 can be provided near the operation position of the rider, so that pressure generated during the operation by the rider can be detected efficiently.

According to the first preferred embodiment, pressure applied as the rider contacts the thumb throttle 31 is detected by the pressure sensor 37. With such a simple arrangement, the presence/absence of the operation of the thumb throttle 31 by the rider can be detected.

According to the first preferred embodiment, the four O-rings 34 are arranged to apply resistance to the rotation force generated as the rotation shaft 33 of the thumb throttle 31 rotates. The rotation position of the thumb throttle 31 operated by the rider can be maintained easily. When the snowmobile 1 travels on a bad road, the opening degree of the thumb throttle 31 can easily be maintained at a fixed level.

According to the first preferred embodiment, the torsion coil spring 36 arranged to apply pressure so that the thumb throttle 31 is rotated around the rotation shaft 33 toward the initial position. The operation amount of the thumb throttle 31 is electrically transmitted without using a wire and the thumb throttle 31 can be returned to the initial position automatically by the pressurizing force of the torsion coil spring 36. The thumb throttle 31 can be operated simply by pressurizing one surface of the thumb throttle 31. Furthermore, since a pressurizing force having a prescribed level or more is necessary to rotate the thumb throttle 31, a large threshold value can be set for operating or not operating the pressure sensor 37. In this way, erroneous detection about the presence/absence of the operation by the pressure sensor 37 can be prevented.

Second Preferred Embodiment

Figure 7:
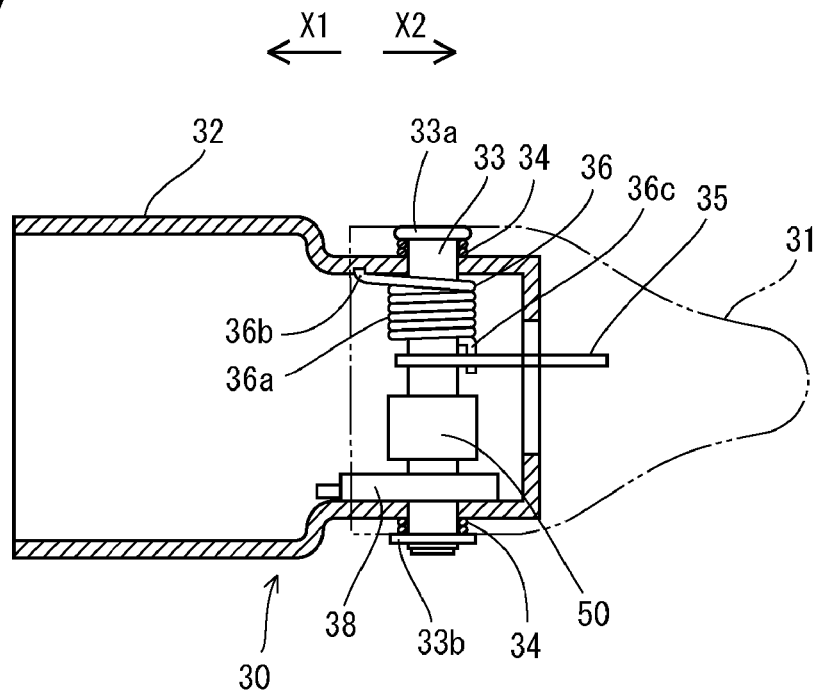
FIG. 7 is a rear sectional view of an internal structure of an operation portion according to a second preferred embodiment of the present invention.

Now, a second preferred embodiment of the present invention will be described. FIG. 7 is a rear sectional view of the internal structure of the operation portion 30 according to the second preferred embodiment. The second preferred embodiment is different from the first preferred embodiment in that a rotation torque sensor 50 is provided to detect the presence/absence of the operation of the thumb throttle 31.

As shown in FIG. 7, the rotation shaft 33 rotated together with the thumb throttle 31 is provided with the rotation torque sensor 50. The rotation torque sensor 50 is an example of the "operation input detector" according to a preferred embodiment of the present invention. The rotation torque sensor 50 detects whether the thumb throttle 31 has been operated by the rider. More specifically, the rotation torque sensor 50 detects the presence/absence of torque when the rotation shaft 33 is rotated. The rotation torque sensor 50 detects the rotation of the rotation shaft 33 rotated together with the thumb throttle 31 when the thumb throttle 31 has been operated by the rider. The rotation torque sensor 50 detects the presence/absence of the torque while the rotation shaft 33 rotates as the presence/absence of the operation of the thumb throttle 31 by the rider.

According to the second preferred embodiment, the rotation torque sensor 50 can be provided on the rotation shaft of the thumb throttle 31, so that a more simplified arrangement than the first preferred embodiment can be obtained.

Note that the other structure and effects of the second preferred embodiment are the same as those of the first preferred embodiment.

Third Preferred Embodiment

A third preferred embodiment of the present invention will be described. The third preferred embodiment is different from the first preferred embodiment in that the APS 138 is provided on a shaft different from the rotation shaft 33.

Figure 8:
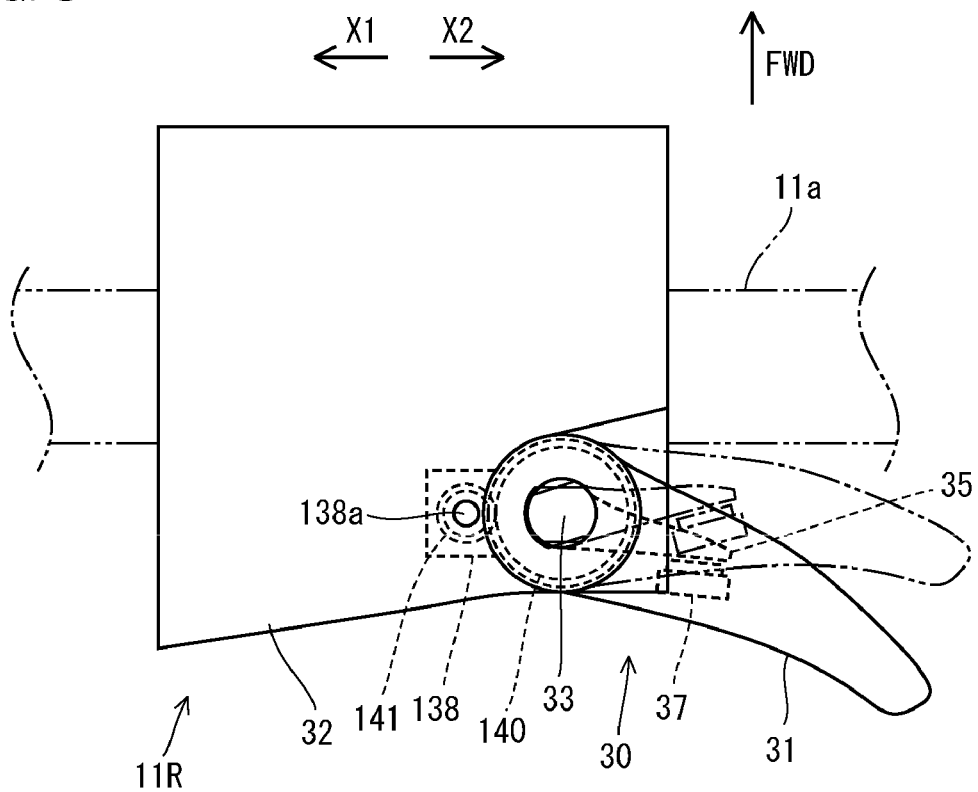
FIG. 8 is an enlarged plan view of a handle according to a third preferred embodiment of the present invention.

FIG. 8 is an enlarged plan view of a right handle 11R according to the third preferred embodiment. As shown in FIG. 8, a gear 140 rotated together with the rotation shaft 33 is provided at the rotation shaft 33. The gear 140 is engaged with a gear 141 having a smaller gear diameter than that of the gear 140. The gear 140 is an example of the "transmitting member" and the "first gear" according to the present invention and the gear 141 is an example of the "transmitting member" and the "second gear" according to a preferred embodiment of the present invention.

Figure 9:
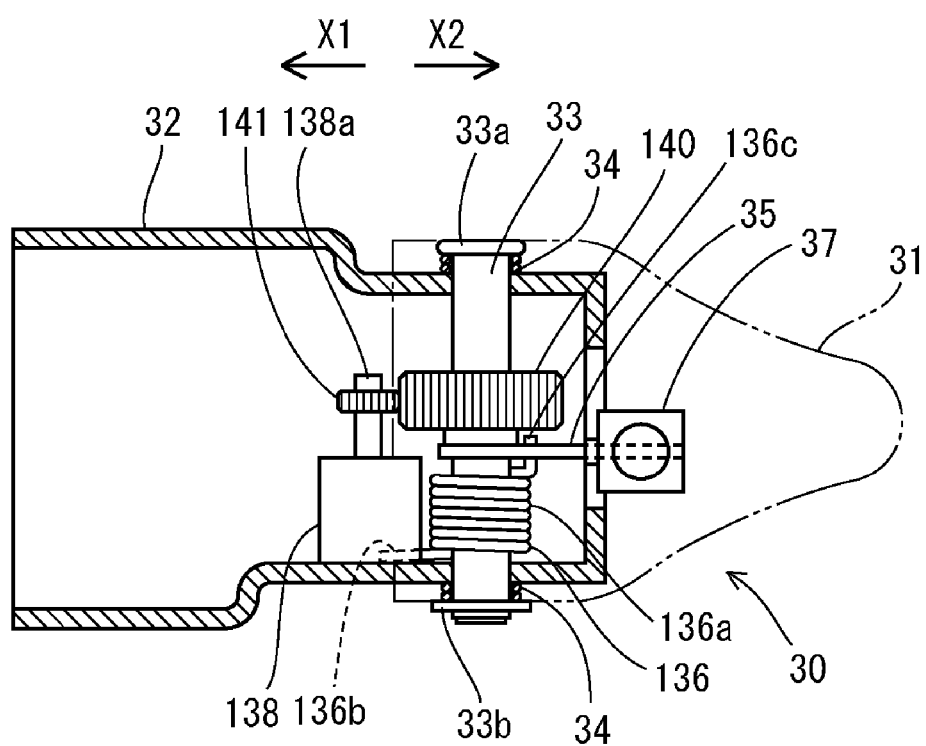
FIG. 9 is a rear sectional view of an internal structure of an operation portion according to the third preferred embodiment of the present invention.

FIG. 9 is a rear sectional view of the internal structure of the operation portion 30 according to the third preferred embodiment of the present invention. As shown in FIG. 9, a torsion coil spring 136 includes a coil portion 136a attached near the lower end of the rotation shaft 33. One end 136b of the torsion coil spring 136 is hooked at the inner wall surface of the case 32. The other end 136c of the torsion coil spring 136 is in contact with the arm 35 from the front. In this way, the torsion coil spring 136 pressurizes the thumb throttle 31 through the arm 35 to the back. When no operation force from the rider is applied, the pressurizing force of the torsion coil spring 136 causes the thumb throttle 31 to be rotated to the initial position on the back side. The torsion coil spring 136 is an example of the "pressurizing member" according to a preferred embodiment of the present invention.

The gear 141 is fixed to the rotation shaft 138a. The rotation shaft 138a is rotatably supported to the case 32. The gear 141 rotates together with the rotation shaft 138a. The rotation shaft 138a is provided more on the left side than the rotation shaft 33 (in the X1-direction) in the vehicle widthwise direction. The APS 138 is provided around the lower end of the rotation shaft 138a. The APS 138 is an example of the "operation amount detector" according to a preferred embodiment of the present invention. The APS 138 detects the rotation amount of the rotation shaft 138a that rotates together with the gear 141 as the operation amount of the thumb throttle 31 by the rider.

As the operation of the thumb throttle 31 by the rider causes the rotation shaft 33 to be rotated, the gear 140 rotates together with the rotation shaft 33. The gear 141 is engaged with the gear 140 and therefore the gear 141 is rotated as the gear 140 is rotated. The gear diameter of the gear 141 is smaller than that of the gear 140, and therefore the rotation amount of the gear 141 is greater than the rotation amount of the gear 140. The rotation amount of the rotation shaft 138a that rotates together with the gear 141 is greater than the rotation amount of the rotation shaft 33. If the operation amount of the thumb throttle 31 is small, the rotation amount of the rotation shaft 138a can be increased in relation with the gear ratio between the gears 140 and 141, and the APS 138 can improve the detection accuracy about the rotation amount of the thumb throttle 31.

The other structure of the third preferred embodiment is the same as that of the first preferred embodiment.

According to the third preferred embodiment, the gear 140 attached to the rotation shaft 33 to rotate together with the rotation shaft 33 is provided. The gear 141 having a smaller gear diameter than that of the gear 140 and rotating as the gear 140 rotates is provided. The APS 138 is arranged to detect the rotation amount of the gear 141. The rotation amount of the gear 141 engaged with the gear 140 is greater than the rotation amount of the gear 140. The rotation amount of the rotation shaft 33 rotated by the operation of the thumb throttle 31 is increased and transmitted to the APS 138 as the operation amount of the thumb throttle 31. This can improve the detection resolution of the operation amount of the thumb throttle 31.

According to the third preferred embodiment, the torsion coil spring 136 arranged to apply pressure so that the thumb throttle 31 is rotated around the rotation shaft 33 toward the initial position. The pressurizing force of a prescribed level or more is necessary to rotate the thumb throttle 31. In this way, the threshold value for operating/not operating the pressure sensor 37 can be set to a large value. Erroneous detection of the presence/absence of operation by the pressure sensor 37 can be prevented.

The other effects of the third preferred embodiment are the same as those of the first preferred embodiment.

Fourth Preferred Embodiment

Now, a fourth preferred embodiment of the present invention will be described. The fourth preferred embodiment is different from the first preferred embodiment in that the rotation shaft 233 of a thumb throttle 231 is provided ahead of a grip 11a.

Figure 10:
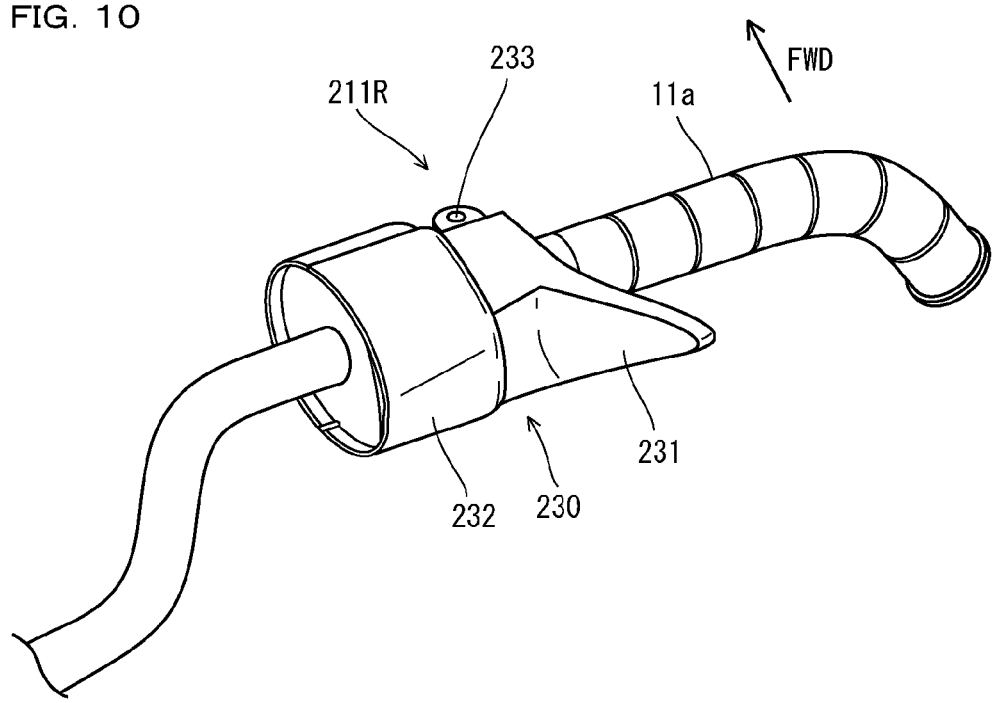
FIG. 10 is a perspective view of a handle according to a fourth preferred embodiment of the present invention.

FIG. 10 is a perspective view of a right handle 211R according to the fourth preferred embodiment of the present invention. As shown in FIG. 10, the right handle 211R includes the grip 11a and an operation portion 230 provided near the grip 11a. The operation portion 230 is operated by the right hand of the rider and controls driving of the engine 4. The operation portion 230 includes a resin thumb throttle 231 and a case 232 that supports the thumb throttle 231. The thumb throttle 231 is rotatably supported at the case 32. The thumb throttle 231 is operated by the thumb of the right hand of the rider. The thumb throttle 231 controls driving of the engine 4. More specifically, the thumb throttle 231 controls driving of the engine 4 by controlling the open/closed state of the throttle valve. The thumb throttle 231 is an example of the "throttle lever" according to a preferred embodiment of the present invention.

Figure 11:
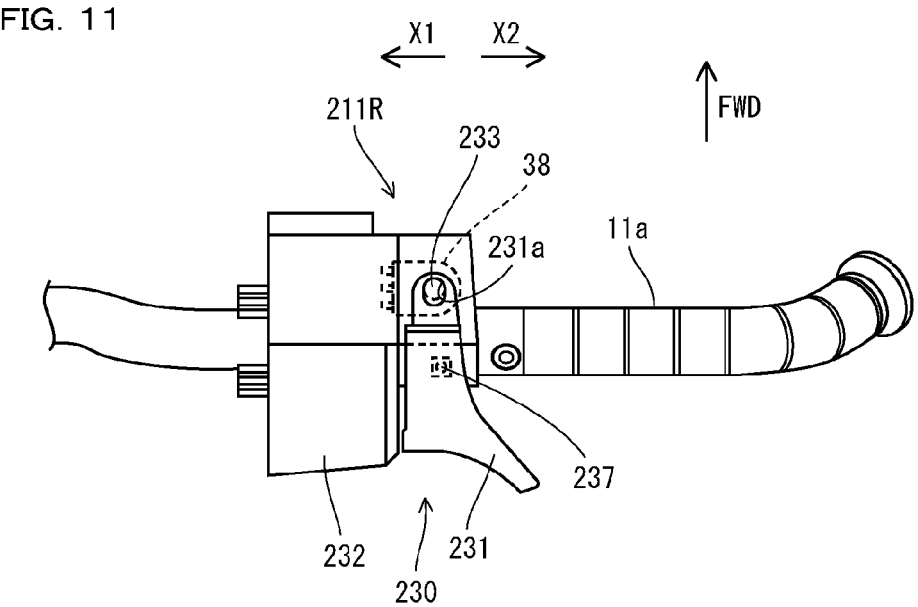
FIG. 11 is a plan view of the handle according to the fourth preferred embodiment of the present invention.

FIG. 11 is a plan view of the right handle 211R. As shown in FIG. 11, the operation portion 230 includes a metal rotation shaft 233 attached to the resin case 232. The rotation shaft 233 is provided ahead of the grip 11a (in the direction of the arrow FWD). The rotation shaft 233 is rotatably supported at the case 232.

Figure 12:
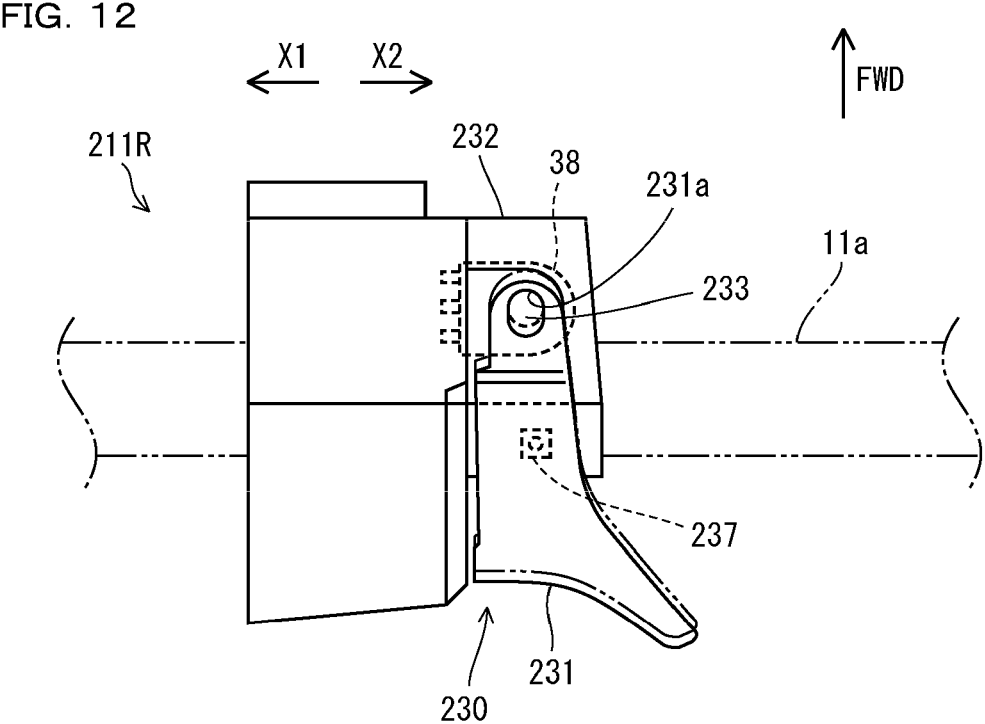
FIG. 12 is an enlarged plan view of the handle according to the fourth preferred embodiment of the present invention.

FIG. 12 is an enlarged plan view of the right handle 211R. When operated by the rider, the thumb throttle 231 is arranged to move forward before rotating around the rotation shaft 233. As shown in FIG. 12, the thumb throttle 231 is provided with an elongated hole 231a at a portion corresponding to the rotation shaft 233. The rotation shaft 233 is movable in the front-back direction in the elongated hole 231a. The thumb throttle 231 can slide in the front-back direction on the case 232 along the elongated hole 231a because the rotation shaft 233 is inserted in the elongated hole 231a. A projection that is not shown is provided at the inner circumferential surface of the elongated hole 231a of the thumb throttle 231 and when the thumb throttle 231 slides forward, the projection is engaged with a recess (not shown) provided at the rotation shaft 233. In this way, the thumb throttle 231 slides forward and then the thumb throttle 231 and the rotation shaft 233 are rotated as they are integrated.

Figure 13:
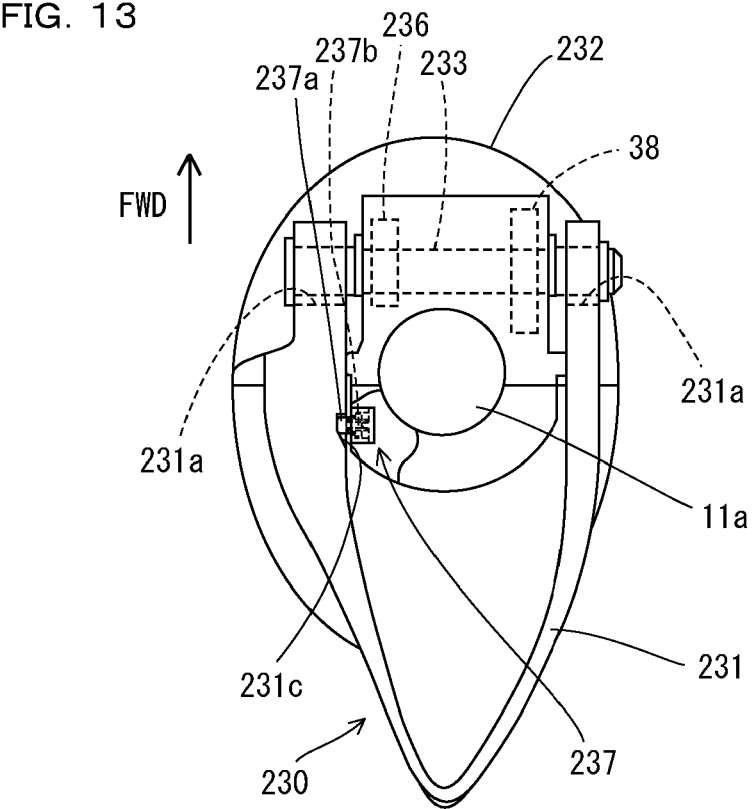
FIG. 13 is a right side view of the handle according to the fourth preferred embodiment of the present invention.

FIG. 13 is a right side view of the operation portion 230. As shown in FIG. 13, a ball switch 237 is provided between the thumb throttle 231 and the case 232. The ball switch 237 is an example of the "operation input detector" according to a preferred embodiment of the present invention. The ball switch 237 determines whether the thumb throttle 231 has been operated by the rider.

Figure 14:
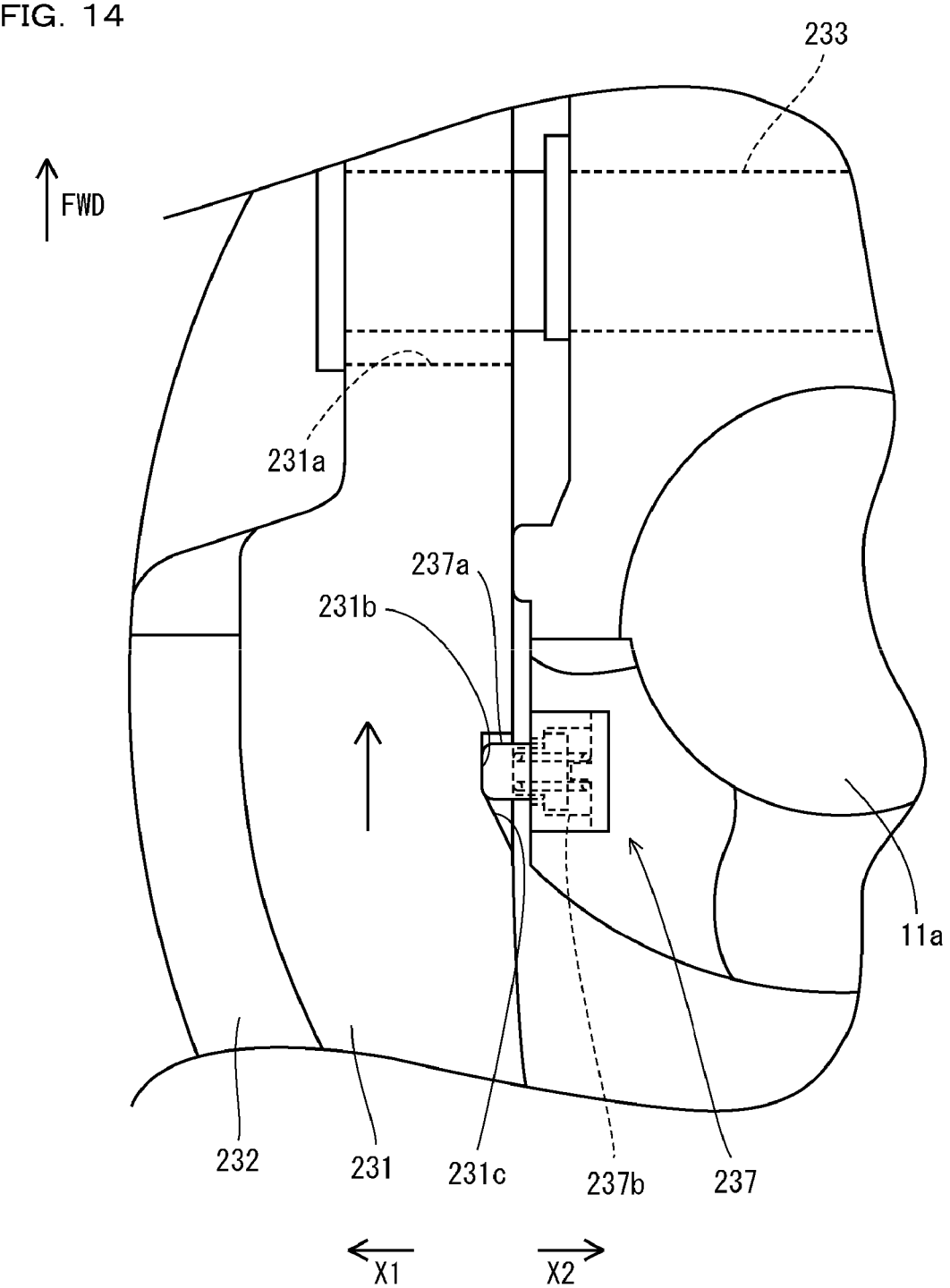
FIG. 14 is an enlarged side view of a structure of a switch according to the fourth preferred embodiment of the present invention.

FIG. 14 is an enlarged right side view of the operation portion 230 showing the peripheral structure of the ball switch 237. As shown in FIG. 14, the ball switch 237 has a ball portion 237a and a main portion 237b. The portion of the thumb throttle 231 opposed to the ball switch 237 is provided with a notch 231b. The notch 231b has an inclined portion 231c inclined in the moving direction (front-back direction) of the ball portion 237a of the ball switch 237. When the thumb throttle 231 is not operated by the rider, the ball portion 237a comes into the notch 231b as shown in FIG. 14.

Figure 15:
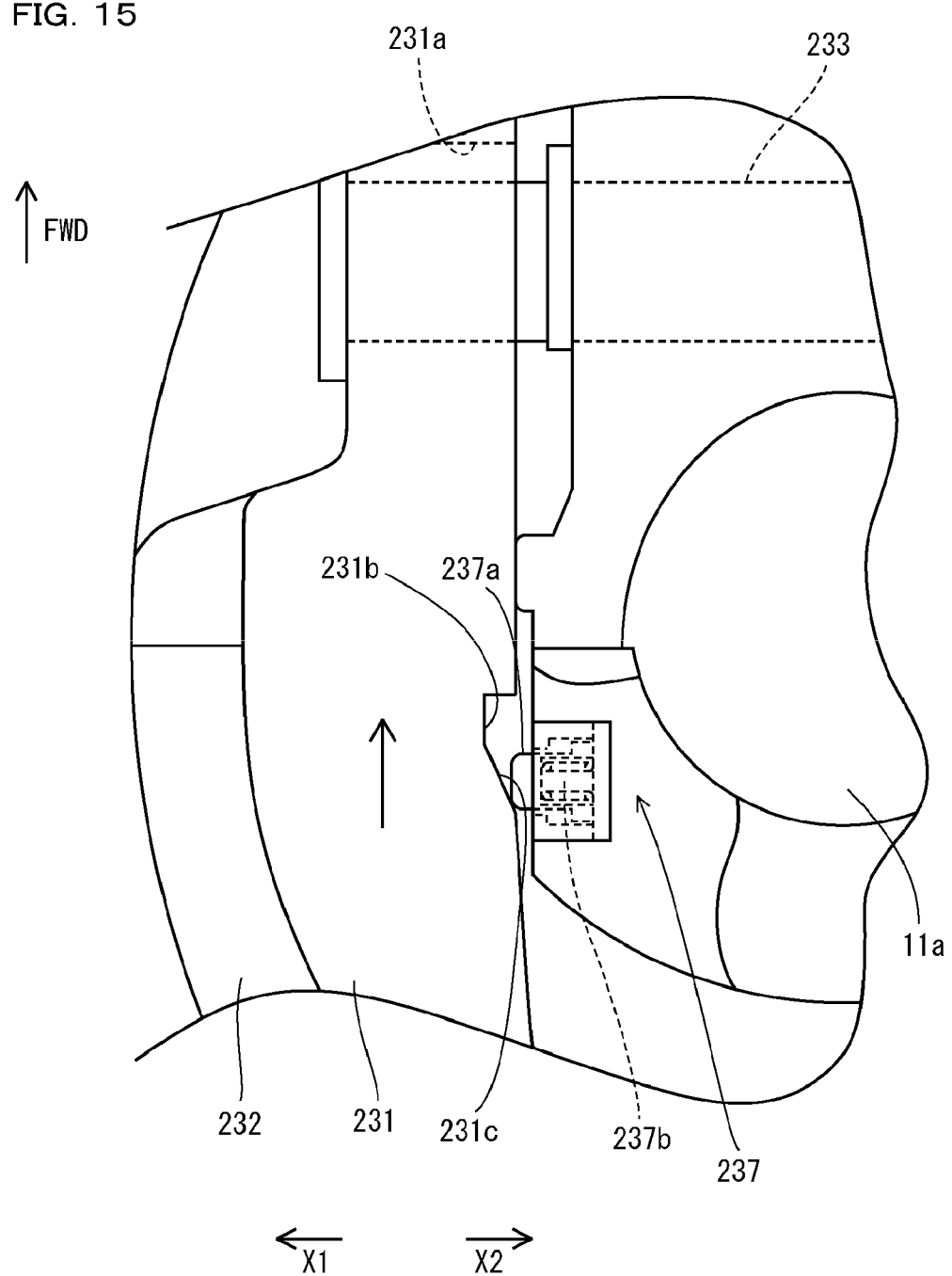
FIG. 15 is an enlarged side view of the structure of the switch according to the fourth preferred embodiment of the present invention.

FIG. 15 is an enlarged right side view of the operation portion 230 also showing the peripheral structure of the ball switch 237. When operated by the rider, the thumb throttle 231 slides forward as shown in FIG. 15. At the time, the ball portion 237a of the ball switch portion 237 is pushed to the right (in the X2-direction) by the notch 231b. In this way, the ball switch 237 is turned on and it is determined that the thumb throttle 231 has been operated by the rider.

As shown in FIG. 13, the rotation shaft 233 is provided with a coil spring 236. The coil spring 236 is an example of the "pressurizing member" according to a preferred embodiment of the present invention. The coil spring 236 is arranged to move the thumb throttle 231 operated by the rider to the initial position. The thumb throttle 231 moves forward by the operation of the rider and then rotates by the operation of the rider. The coil spring 236 pressurizes the rotated thumb throttle 231 back to its state before the rotation. The coil spring 236 also pressurizes the thumb throttle 231 moved forward in the backward direction. The coil spring 236 can increase operation pressure necessary to rotate the thumb throttle 231 during the operation by the rider by the pressurizing force of the coil spring 236. This surely allows the thumb throttle 231 to move forward before it is rotated.

Figure 16:
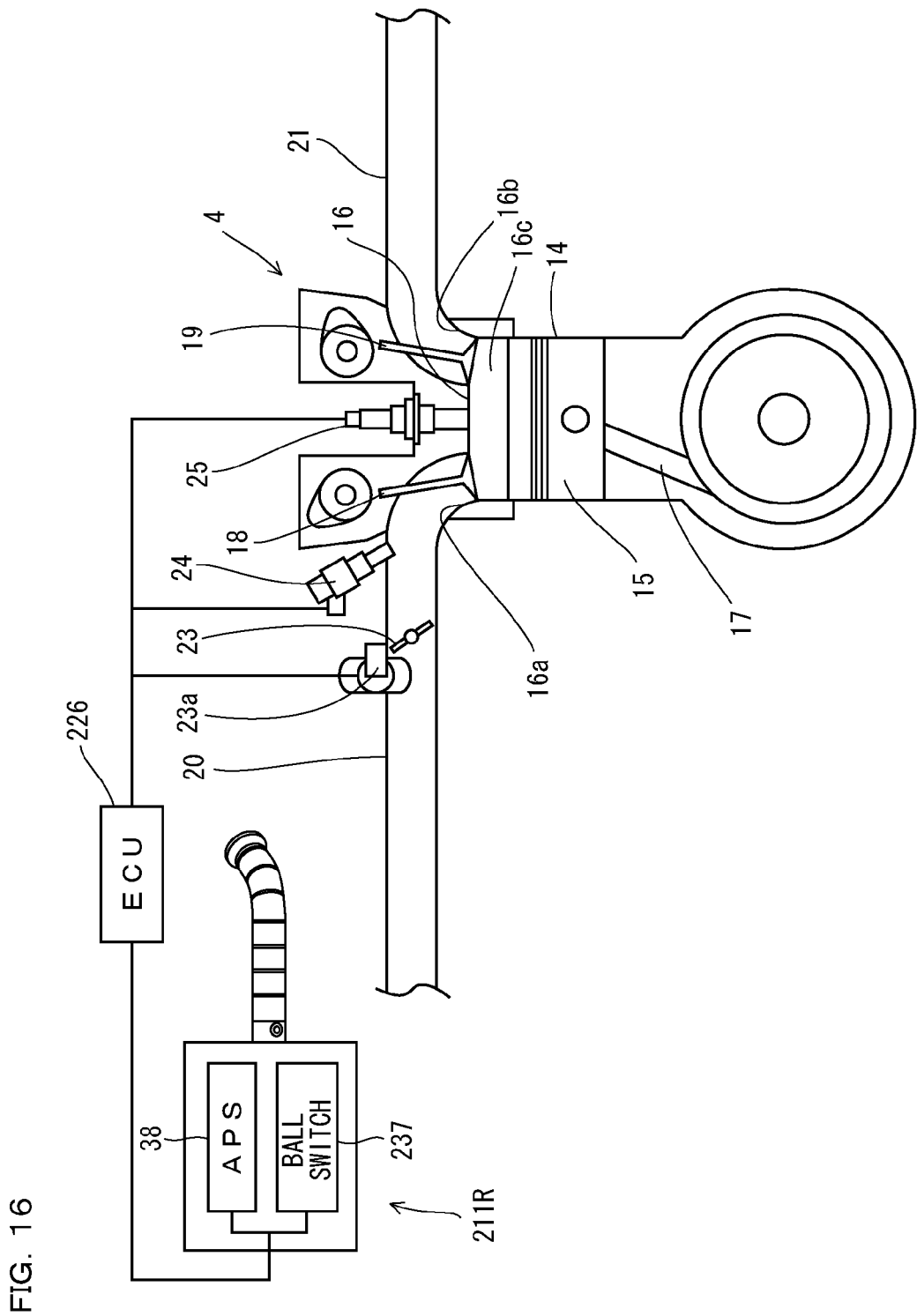
FIG. 16 is a system diagram of a peripheral structure of an ECU in a snowmobile according to the fourth preferred embodiment of the present invention.

FIG. 16 is a system diagram showing the engine 4, the ECU 226, and its peripheral structure. As shown in FIG. 16, the ball switch 237 transmits a detection signal indicating whether the thumb throttle 231 has been operated by the rider to the ECU 226. If the ball switch 237 is not pressurized and in an off state and it is determined by the TPS 23a that the throttle valve 23 is in an open state, the ECU 226 carries out control to reduce the engine speed of the engine 4 to a prescribed value or less.

The other structure of the fourth preferred embodiment is the same as that of the first preferred embodiment.

According to the fourth preferred embodiment, the thumb throttle 231 is provided slidably in the front-back direction with respect to the operation portion 230. The ball switch 237 that is pressed down as the thumb throttle 231 slides is provided. Using the ball switch 237, it can be determined whether the operation of the thumb throttle 231 by the rider has been carried out.

According to the fourth preferred embodiment, the coil spring 236 pressurized the thumb throttle 231 moved forward and rotated so that the thumb throttle 231 is moved to the initial position. Operation pressure at a prescribed value or more is necessary to rotate the thumb throttle 231. The thumb throttle 231 can surely be moved forward before it is rotated.

The other effects of the fourth preferred embodiment are the same as those of the first preferred embodiment.

Fifth Preferred Embodiment

Now, a fifth preferred embodiment of the present invention will be described. The fifth preferred embodiment is different from the fourth preferred embodiment in that the rotation shaft 333 slides in the front-back and right-left directions on the case 332.

Figure 17:
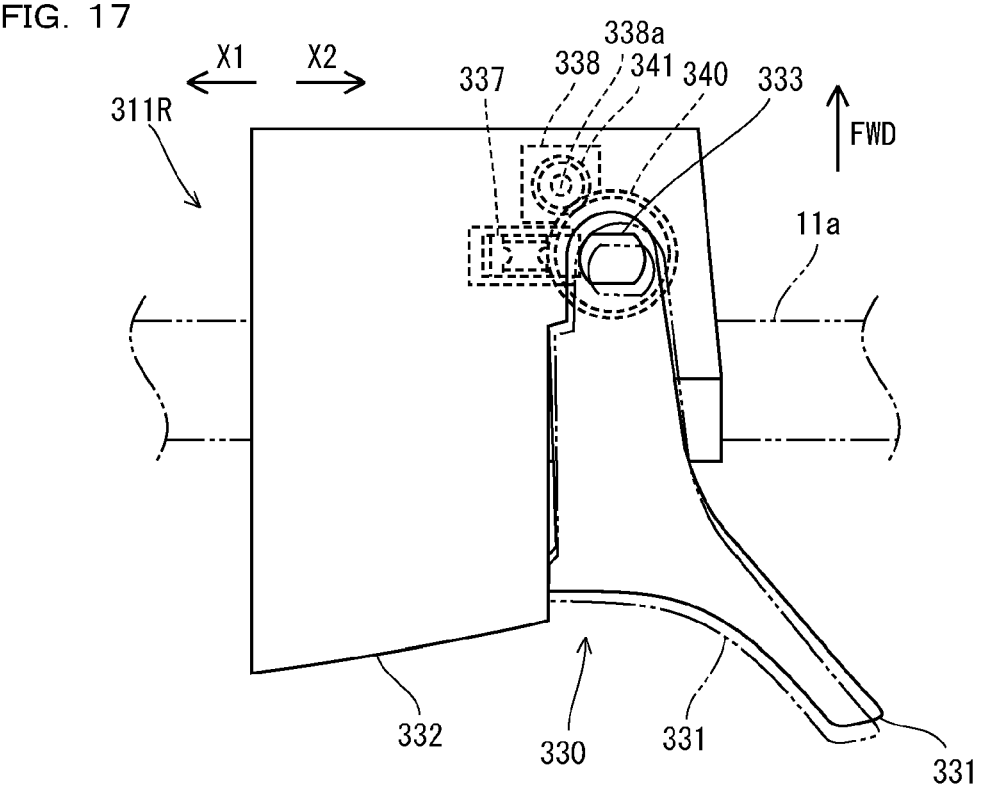
FIG. 17 is an enlarged plan view of a handle according to a fifth preferred embodiment of the present invention.

FIG. 17 is an enlarged plan view of a right handle 311R. As shown in FIG. 17, the right handle 311R according to the fifth preferred embodiment includes a grip 11a and an operation portion 330. The operation portion 330 is operated by the right hand of the rider to control driving of the engine 4 and adjust the speed of the snowmobile 1. The operation portion 330 includes a rubber thumb throttle 331 and a case 332 arranged to support the thumb throttle 331. The thumb throttle 331 is rotatably supported at the case 332. The thumb throttle 331 is operated by the thumb of the right hand of the rider to control the engine 4. More specifically, the thumb throttle 331 controls the opening/closed state of the throttle valve and thus controls driving of the engine 4. The thumb throttle 331 is an example of the "throttle lever" according to a preferred embodiment of the present invention.

Figure 18:
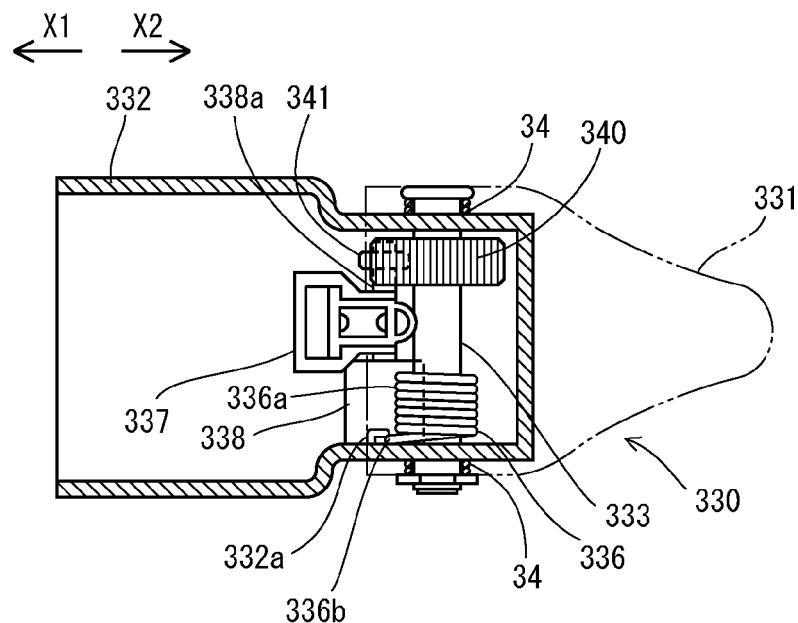
FIG. 18 is a rear sectional view of an internal structure of an operation portion according to the fifth preferred embodiment of the present invention.

FIG. 18 is a rear sectional view of the internal structure of the operation portion 330. As shown in FIG. 18, the operation portion 330 includes a rotation shaft 333 that is rotatable and slidable on the case 332. As shown in FIG. 17, the rotation shaft 333 is provided ahead of the grip 11a. As shown in FIG. 17, the rotation shaft 333 slides obliquely leftward and forward together with the thumb throttle 331 when the thumb throttle 331 is operated by the rider.

As shown in FIG. 18, a torsion coil spring 336 includes a coil portion 336a attached near the lower end of the rotation shaft 333. One end 336b of the torsion coil spring 336 is hooked at a hook portion 332a projecting from the inner wall surface of the case 332. The other end (not shown) of the torsion coil spring 336 is in contact with the thumb throttle 331. In this way, the torsion coil spring 336 can pressurize the thumb throttle 331 to be rotated to the initial position at the back. The torsion coil spring 336 is an example of the "pressurizing member" according to a preferred embodiment of the present invention.

The torsion coil spring 336 can increase operation pressure necessary to rotate the thumb throttle 331 based on the pressurizing force of the torsion coil spring 336. In this way, operation pressure at a prescribed value or more is necessary to rotate the thumb throttle 331. When rotated by the operation by the rider, the thumb throttle 331 can surely be moved forward.

FIG. 19 is a plan view of a right handle 331R as the thumb throttle 331 is provided at the initial position. FIG. 20 is a plan view of the right handle 311R as the thumb throttle 331 moves forward. As shown in FIG. 19, an axial load detection switch 337 is provided on the side in the X1-direction of the rotation shaft 333. The axial load detection switch 337 is an example of the "operation input detector" according to a preferred embodiment of the present invention.

The axial load detection switch 337 is turned on by a load provided to the axial load detection switch 337 when the rotation shaft 333 moves forward to the position shown in FIG. 20 from the position shown in FIG. 19. The axial load detection switch 337 detects the presence/absence of the operation of the thumb throttle 331 by the rider. When the thumb throttle 331 has been operated by the rider and slid forward (in the FWD-direction) and leftward (in the X1-direction), the rotation shaft 333 slides forward (in the FWD-direction) and leftward (in the X1-direction) according to the sliding of the thumb throttle 331. The axial load detection switch 337 detects the sliding of the rotation shaft 333 to the left (in the X1-direction) and thus detects the presence/absence of the operation of the thumb throttle 331 by the rider.

The rotation shaft 333 is provided with a gear 340 that rotates together with the rotation shaft 333. A gear 341 with a gear diameter smaller than the gear 340 is provided near the gear 340. As shown in FIG. 20, the gear 341 is engaged with the gear 340 when the rotation shaft 333 slides forward (in the FWD-direction) and leftward (in the X1-direction) according to the sliding of the thumb throttle 331. On the other hand, when the thumb throttle 331 is not operated by the rider, the gears 340 and 341 are arranged so that they are not engaged with each other as shown in FIG. 19. The gear 340 is an example of the "transmitting member" and the "first gear" according to a preferred embodiment of the present invention and the gear 341 is an example of the "transmitting member" and the "second gear" according to a preferred embodiment of the present invention.

As shown in FIGS. 17 and 18, an APS 338 is provided under and ahead of the axial load detection switch 337. The APS 338 is provided under the shaft 338a that rotates as the gear 341 rotates. The APS 338 is an example of the "operation amount detector" according to a preferred embodiment of the present invention.

The other structure of the fifth preferred embodiment is the same as that of the fourth preferred embodiment.

In the first to fifth preferred embodiments described above, the snowmobile is an example of a vehicle including an engine and an operation portion that controls driving of the engine. The present invention is not limited to the above and may be applied to a straddle type vehicle other than the snowmobile such as an SSV (Side by Side Vehicle) and an ATV (All Terrain Vehicle).

In the first to third preferred embodiments described above, the pressure sensor that detects pressure applied during operation by the rider preferably is an example of the operation input detector. The present invention is not limited to the above, and a touch sensor that detects static electricity generated from the rider's hand or a distortion sensor such as a distortion gauge that detects the distortion of the thumb throttle operated by the rider may be used.

In the first to fifth preferred embodiments described above, the injector preferably is an example of the component that supplies fuel to the engine. The present invention is not limited to the above and a component other than the injector such as a carburetor may be used.

In the first to fifth preferred embodiments described above, the TPS that detects the opening degree of the throttle valve preferably is an example of the control state detector that detects the control state of the engine. The present invention is not limited to the above, and any other device that detects the control state of the engine such as a crank angle sensor that detects the engine speed of the engine may be used in place of the TPS.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A straddle type vehicle comprising:
   an engine;
   a handle including a grip arranged to be grasped by a rider;
   an operation portion arranged to control driving of the engine;
   an operation input detector arranged to detect whether operation of the operation portion by the rider is carried out;
   an operation amount detector arranged to electrically detect an operation amount of the operation portion; and
   a control portion programmed to control driving of the engine based on the operation amount detected by the operation amount detector when operation of the operation portion by the rider is detected at the operation input detector.

2. The straddle type vehicle according to claim 1, wherein the control portion is programmed to control driving of the engine according to a prescribed method independent of a detection value detected by the operation amount detector when the operation of the operation portion by the rider is not detected at the operation input detector.

3. The straddle type vehicle according to claim 1, wherein the operation portion includes a throttle lever arranged to rotate around a rotation shaft, and the operation amount detector is arranged to detect a rotation amount of the throttle lever around the rotation shaft as the operation amount of the throttle lever.

4. The straddle type vehicle according to claim 3, wherein the operation amount detector is provided near the rotation shaft.

5. The straddle type vehicle according to claim 3, wherein the operation amount detector is arranged coaxially with the rotation shaft.

6. The straddle type vehicle according to claim 3, wherein the rotation shaft is arranged behind the grip in a front-back direction of the vehicle.

7. The straddle type vehicle according to claim 1, wherein at least a portion of the operation input detector is located at the operation portion.

8. The straddle type vehicle according to claim 1, wherein the operation input detector includes a contact sensor arranged to detect a contact with the operation portion.

9. The straddle type vehicle according to claim 8, wherein the contact sensor includes a pressure sensor arranged to detect pressure applied to the operation portion.

10. The straddle type vehicle according to claim 3, wherein the throttle lever is arranged to move together with the rotation shaft with respect to the operation portion, and the operation input detector includes a switch pressurized by the movement of the throttle lever.

11. The straddle type vehicle according to claim 3, further comprising a resisting member arranged to generate a resistance to a rotation force around the rotation shaft of the throttle lever.

12. The straddle type vehicle according to claim 3, further comprising a pressurizing member arranged to rotate the throttle lever around the rotation shaft to an initial position.

13. The straddle type vehicle according to claim 3, further comprising a transmitting member to which the rotation of the rotation shaft is transmitted, wherein the operation amount detector is arranged to detect a rotation of the transmitting member as the operation amount of the operation by the rider.

14. The straddle type vehicle according to claim 13, wherein the transmitting member includes:
   a first gear arranged to rotate as the rotation shaft rotates; and
   a second gear rotated as the first gear rotates and having a smaller gear diameter than the first gear; and
   the operation amount detector is arranged to detect the operation of the operation portion by the rider by detecting the rotation amount of the second gear.

15. The straddle type vehicle according to claim 1, further comprising:
   a control state detector arranged to detect a control state of the engine; and
   an intake control valve arranged to regulate an amount of air to be taken into the engine;
   the control state detector including an opening/closing detector arranged to detect an open/closed state of the intake control valve.

16. The straddle type vehicle according to claim 1, wherein the straddle type vehicle is a snowmobile.

17. The straddle type vehicle according to claim 1, wherein the operation portion is located adjacent to the grip.

18. The straddle type vehicle according to claim 1, wherein the operation input detector is located adjacent to the grip.

19. The straddle type vehicle according to claim 1, wherein the operation amount detector is located adjacent to the grip.

20. The straddle type vehicle according to claim 1, wherein the operation amount detected by the operation amount detector is electrically transmitted to the control portion.

* * * * *